US012338668B2

(12) United States Patent
Smith

(10) Patent No.: US 12,338,668 B2
(45) Date of Patent: Jun. 24, 2025

(54) SELF-CLOSING RESIDENTIAL FIRE HINGE APPARATUS

(71) Applicant: Bryon Smith, Dalton Gardens, ID (US)

(72) Inventor: Bryon Smith, Dalton Gardens, ID (US)

( * ) Notice: Subject to any disclaimer, the term of this patent is extended or adjusted under 35 U.S.C. 154(b) by 0 days.

(21) Appl. No.: 18/229,999

(22) Filed: Aug. 3, 2023

(65) Prior Publication Data

US 2025/0043609 A1 Feb. 6, 2025

(51) Int. Cl.

*E05D 11/00* (2006.01)
*E05D 3/02* (2006.01)
*E05F 1/00* (2006.01)
*E05F 1/12* (2006.01)

(52) U.S. Cl.

CPC ................ *E05F 1/006* (2013.01); *E05D 3/02* (2013.01); *E05F 1/1207* (2013.01); *E05Y 2201/484* (2013.01); *E05Y 2900/132* (2013.01)

(58) Field of Classification Search

CPC ... E05F 1/006; E05F 1/00; E05F 1/002; E05F 1/004; E05F 1/08; E05F 1/12; E05F 1/1207; E05F 1/1215; E05F 15/63; E05F 15/72; E05D 11/00; E05D 3/02; E05D 3/022; E05Y 2201/484; E05Y 2201/499; E05Y 2900/132; E05Y 2900/134

See application file for complete search history.

(56) References Cited

U.S. PATENT DOCUMENTS

| | | | | | |
|---|---|---|---|---|---|
| 2,037,411 | A | * | 4/1936 | Fay | E05F 1/1016 16/76 |
| 2,520,536 | A | * | 8/1950 | Feeley | A62C 2/242 16/222 |
| 3,325,941 | A | * | 6/1967 | Prucha | E05B 65/104 187/331 |
| 3,403,954 | A | * | 10/1968 | Williams | A62C 2/12 312/351 |
| 3,426,387 | A | * | 2/1969 | Bitney | E05F 1/1215 16/300 |
| 4,073,037 | A | * | 2/1978 | Curry | E05D 7/1016 16/50 |
| 4,073,038 | A | * | 2/1978 | Curry | E05F 1/1215 16/50 |
| 4,161,804 | A | | 7/1979 | D'Hooge | |

(Continued)

FOREIGN PATENT DOCUMENTS

WO WO2018200726 11/2018

*Primary Examiner* — Chuck Y Mah

(57) ABSTRACT

A self-closing residential fire hinge apparatus for closing a door during a fire includes a door hinge with a spring-actuated release mechanism. The spring-actuated release mechanism includes a spring that is pre-tensioned in an open position and a coating covering the spring. The coating is a solid material that retains the spring in the open position. The coating has a melting point less than a melting point of the spring. For example, the coating may be formed of bismuth. When the coating is heated and becomes malleable, the spring is released to a closed position. When the coating is solid and not malleable, the door hinge allows regular opening and closing of the door. The apparatus may also include a spring assembly cap, improving the aesthetics of the assembly. The spring assembly cap may be composed of copper, improving conduction of the ambient heat to melt the coating even faster.

6 Claims, 6 Drawing Sheets

(56) References Cited

U.S. PATENT DOCUMENTS

| | | | | | |
|---|---|---|---|---|---|
| 4,635,729 | A * | 1/1987 | Harmathy | E04B 1/941 | 182/47 |
| 5,048,155 | A * | 9/1991 | Hwang | E05F 1/1215 | 16/301 |
| 5,121,950 | A * | 6/1992 | Davidian | E05B 65/104 | 292/164 |
| 7,293,328 | B2 * | 11/2007 | Endres | E05F 1/1016 | 16/72 |
| 8,375,519 | B1 | 2/2013 | Cooper | | |
| 8,955,194 | B2 | 2/2015 | Teta | | |
| D816,460 | S | 5/2018 | Branning | | |
| 11,047,162 | B1 * | 6/2021 | Tennessee | E05F 1/1016 | |
| 11,053,722 | B2 | 7/2021 | Teta | | |
| 11,428,039 | B2 | 8/2022 | Docksteader | | |
| 11,549,296 | B2 | 1/2023 | Bucklin | | |
| 2005/0284030 | A1 * | 12/2005 | Autovino | E05B 65/104 | 52/1 |
| 2018/0283078 | A1 | 10/2018 | Damboragama | | |
| 2020/0289861 | A1 * | 9/2020 | Venturini | A62C 2/24 | |
| 2023/0003067 | A1 * | 1/2023 | Bucklin | E05F 1/004 | |

* cited by examiner

SELF-CLOSING RESIDENTIAL FIRE HINGE APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to door hinge and more particularly pertains to a new door hinge for automatically closing a door during a fire. Closed doors, particularly bedroom doors in a home or other residence, can significantly slow the spread of a fire. Closed doors can also create isolated areas from the fire, increasing the chances for inhabitants to escape or be rescued. The extra time provided by a closed door can be particularly important when the fire starts while the inhabitants are asleep, because the inhabitants will take longer to realize the fire has started. However, many people prefer sleeping with their doors open, or simply do not remember to close all their doors before going to sleep.

(2) Description of Related Art Including Information Disclosed Under 37 CFR 1.97 and 1.98

The prior art relates to door hinges. The prior art also discloses fire rated doors for commercial settings, which are closed by an alarm system that sends a signal to a spring-loaded door held open by magnets. However, these systems are not designed for use in residential settings. They are typically difficult to install and too expensive for the general public's use in residential settings. Such prior art systems also require installation of an accompanying alarm system, which can drastically increase the cost and labor required before these systems can be used. Thus, there is a need in the prior art for a self-closing fire hinge that is designed for use in residential settings and that can be manufactured with minimal cost resulting in affordable protection in people's homes.

BRIEF SUMMARY OF THE INVENTION

An embodiment of the disclosure meets the needs presented above by generally comprising a fire-actuated release mechanism for a door hinge. Embodiments include a self-closing door hinge having a spring-actuated closure mechanism. The spring-actuated closure mechanism generally includes a spring that is pre-tensioned in an open position and a coating covering the spring. The coating is a solid material configured to retain the spring in the open position. The coating has a melting point that is less than a melting point of the spring, such that the spring may be released and the self-closing door hinge may transition to a closed position when the coating is heated past the coating's melting point. More specifically, once the coating is sufficiently heated, the coating becomes malleable, thereby allowing the spring to be released into the closed position. In exemplary embodiments, the coating comprises bismuth, but the coating may be formed from other materials that also have a lower melting point than the melting point of the spring. Some embodiments also include a spring assembly cap configured to cover the spring-actuated closure mechanism. For example, the spring assembly cap may be formed of copper.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
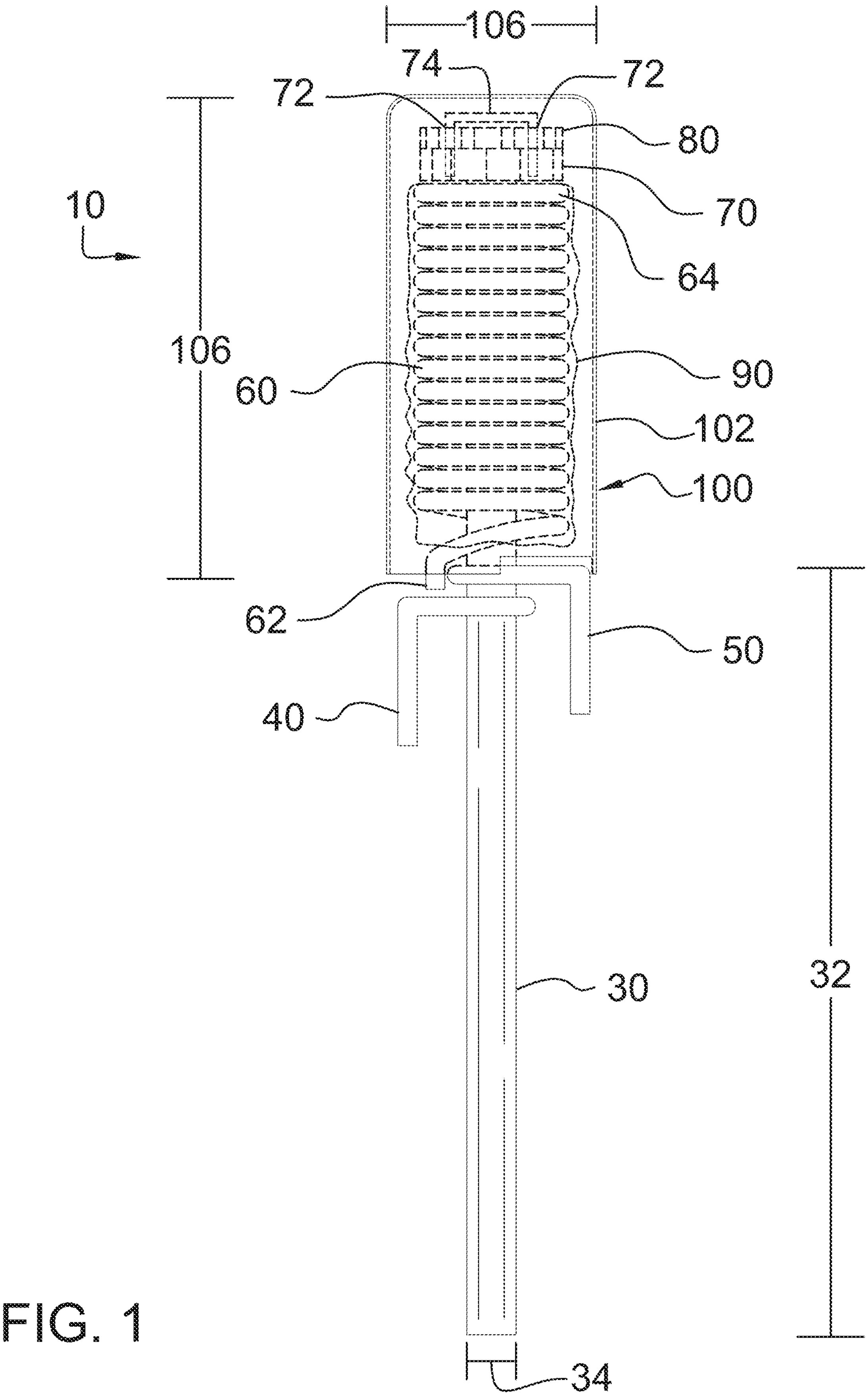
FIG. 1 is a front view of a self-closing residential fire hinge apparatus according to an embodiment of the disclosure.
Figure 2:
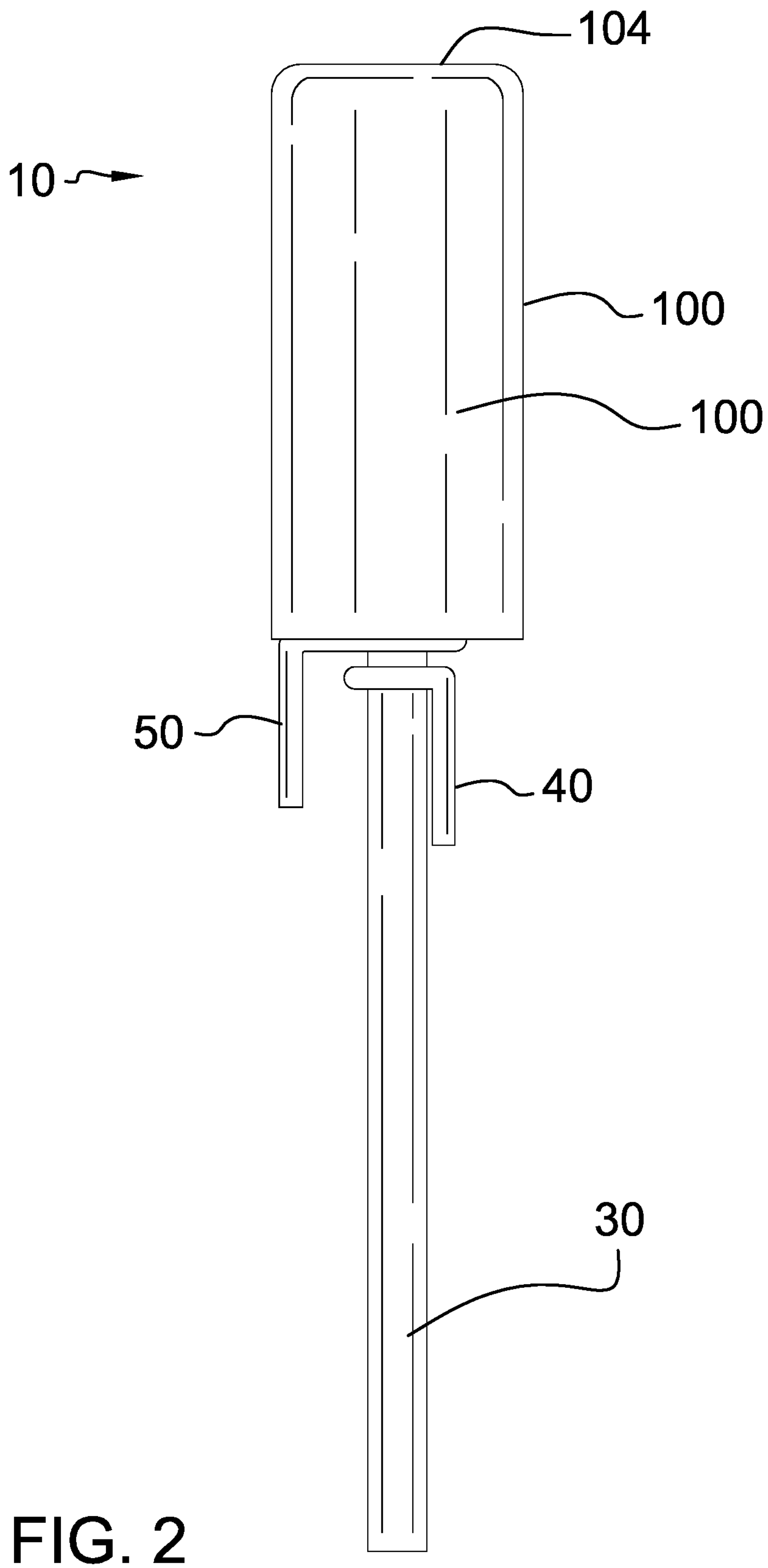
FIG. 2 is a side view of an embodiment of the disclosure.
Figure 3:
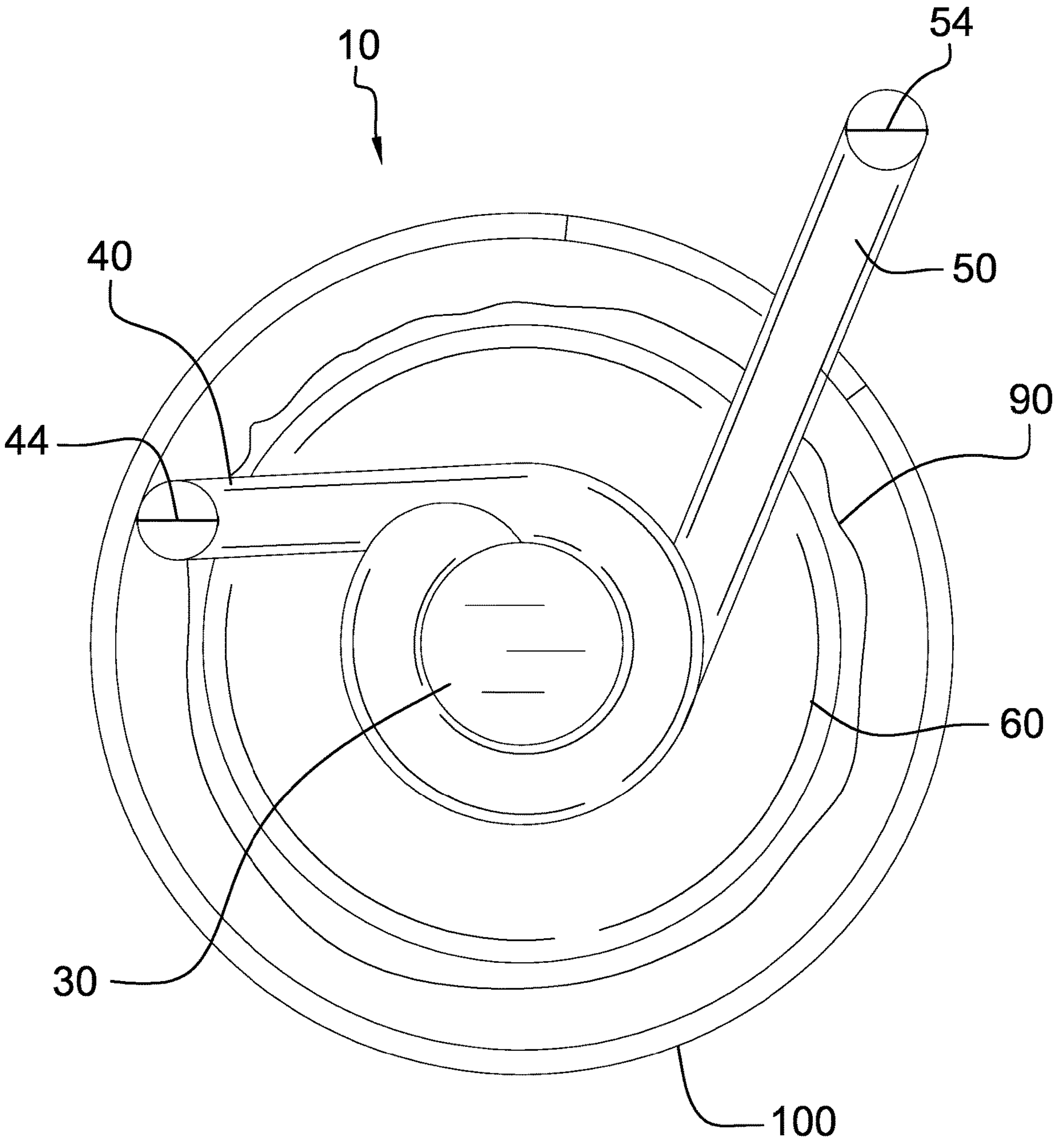
FIG. 3 is a bottom view of an embodiment of the disclosure.
Figure 4:
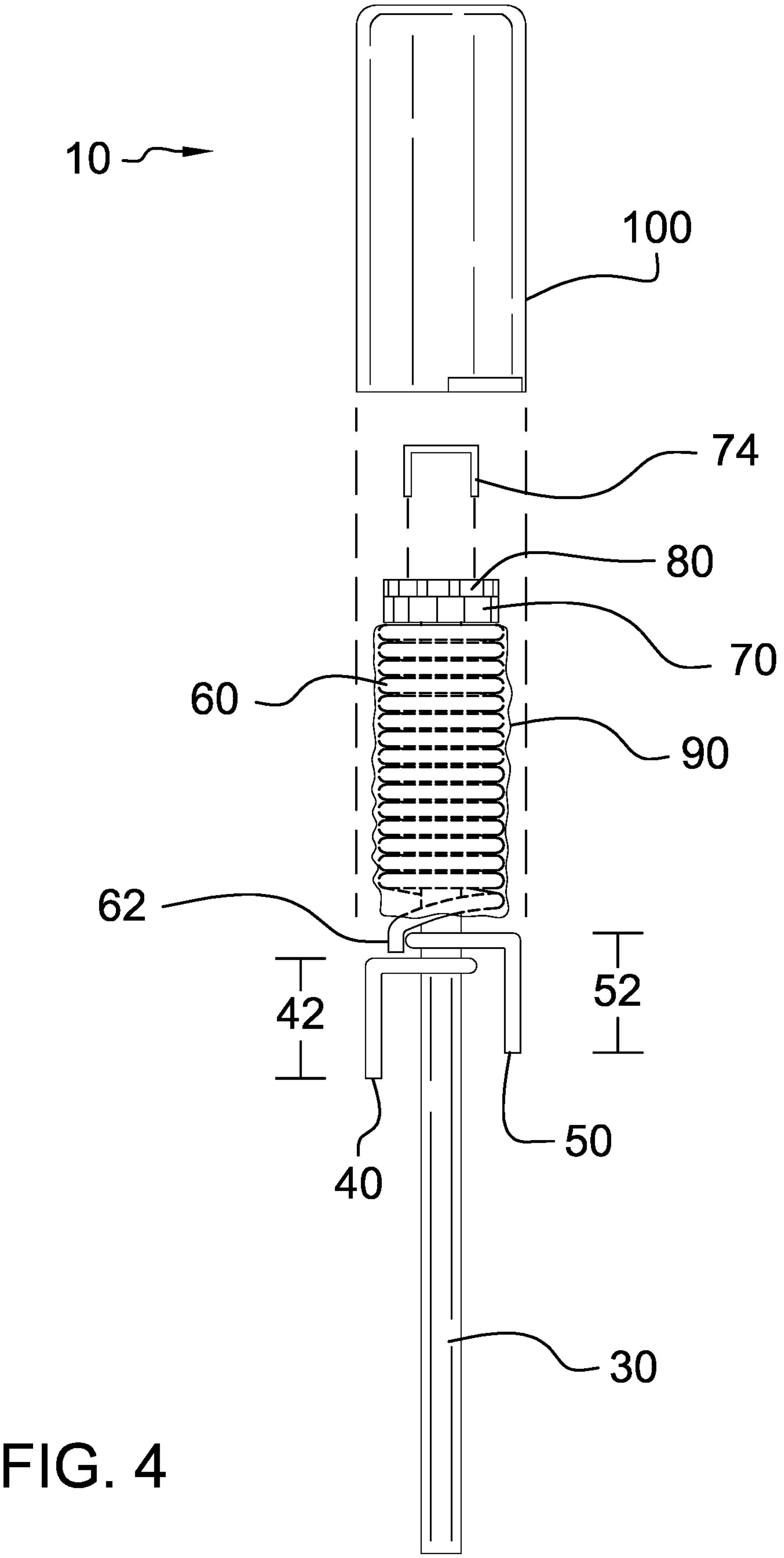
FIG. 4 is an exploded view of an embodiment of the disclosure.

With reference now to the drawings, and in particular to FIGS. 1 through 7 thereof, a new door hinge embodying the principles and concepts of an embodiment of the disclosure and generally designated by the reference numeral 10 will be described.

As best illustrated in FIGS. 1 through 7, the self-closing residential fire hinge apparatus 10 generally comprises a self-closing door hinge having a spring-actuated closure mechanism. The spring-actuated closure mechanism generally includes a spring 60 that is pre-tensioned in an open position and a coating 90 covering the spring 60. The coating 90 is a solid material configured to retain the spring 60 in the open position. The coating 90 has a melting point that is less than a melting point of the spring 60, such that the spring 60 may be released and the self-closing door hinge may transition to a closed position when the coating 90 is heated past the coating's 90 melting point. More specifically, once the coating 90 is sufficiently heated, the coating 90 becomes malleable, thereby allowing the spring 60 to be released into the closed position. In exemplary embodiments, the coating 90 comprises bismuth, but the coating 90 may be formed from other materials that also have a lower melting point than the melting point of the spring 60. Some embodiments also include a spring assembly cap 100 configured to cover the spring-actuated closure mechanism. For example, the spring assembly cap 100 may be formed of copper.

Figure 5:
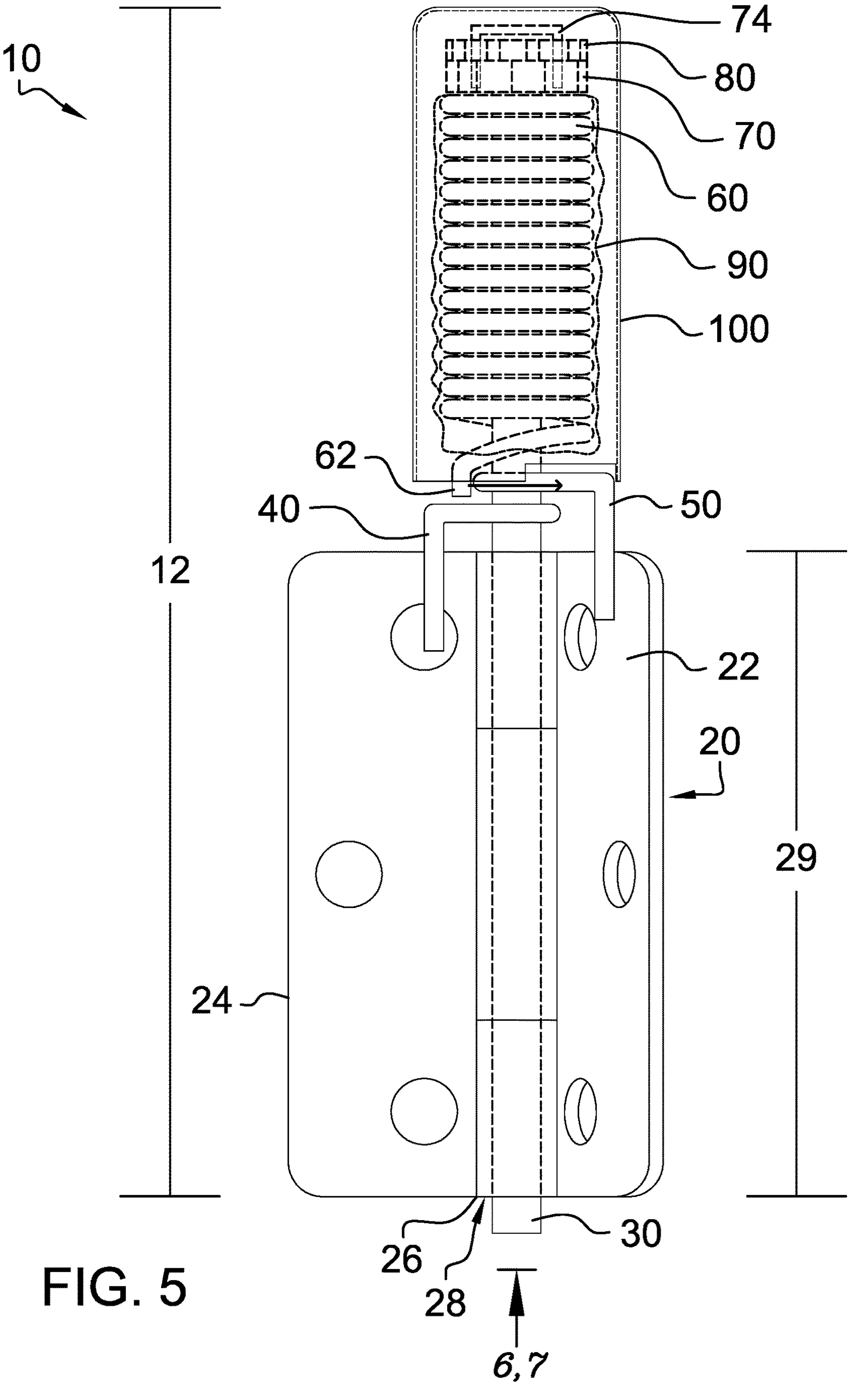
FIG. 5 is an in-use view of an embodiment of the disclosure.

As shown in FIG. 5, the hinge plate 20 has a door plate 22, a jamb plate 24, and a central cylinder 26 rotatably coupling the door plate 22 with the jamb plate 24. The door plate 22 is configured to couple to a door (not pictured). The jamb plate 24 is configured to couple to a door jamb (not pictured). The central cylinder 26 has a cylindrical channel 28 therein extending throughout a length 29 of the central cylinder 26.

Figure 6:
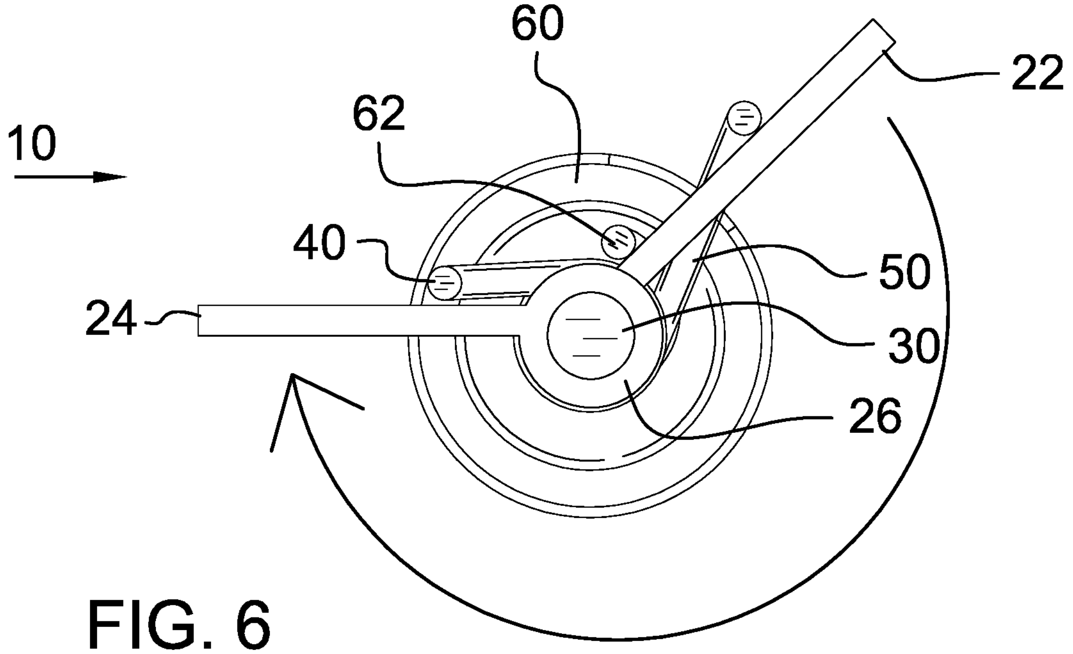
FIG. 6 is an in-use bottom view of an embodiment of the disclosure.
Figure 7:
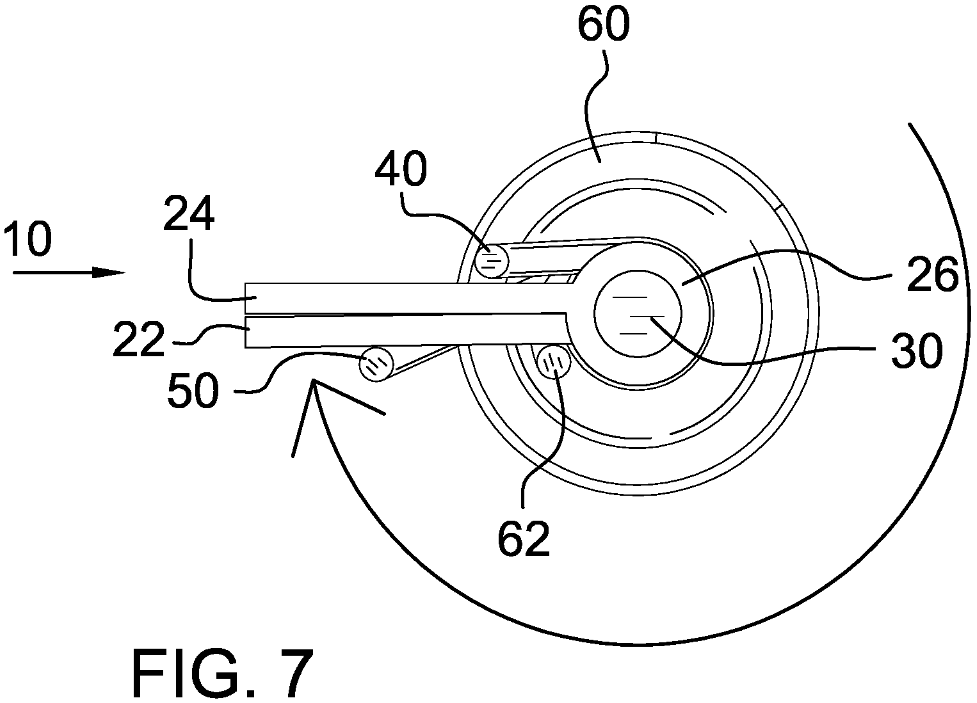
FIG. 7 is an in-use bottom view of an embodiment of the disclosure.

As shown best in FIGS. 6 and 7, the hinge plate 20 has an open position and a closed position. The jamb plate 24 is separated from the door plate 22 when the hinge plate 20 is in the open position. The open position is shown most clearly in FIG. 6. When the hinge plate 20 is in the closed position, the jamb plate 24 is in direct contact with the door plate 22. The closed position is shown most clearly in FIG. 7. Once the hinge plate 20 is installed in a doorway (i.e., when the door plate 22 is coupled with a door and the jamb plate 24 is coupled with a door jamb), the door is open when the hinge plate 20 is in the open position and closed when the hinge plate 20 is in the closed position.

A hinge pin 30 is inserted into the cylindrical channel 28. In exemplary embodiments, the hinge pin 30 has a hinge pin length 32 ranging between 3 inches and 4 inches and a hinge pin diameter 34 ranging between ⅛ inch and ½ inch. The hinge pin 30 should fit snugly within the cylindrical channel 28 of a residential door hinge plate 20. For example, preferred embodiments may include a hinge pin 30 with a hinge pin length 32 of 3¼ inches and a hinge pin diameter 34 of ¼ inch.

A first hinge arm 40 is affixed to the hinge pin 30 above the hinge plate 20. The first hinge arm 40 contacts the jamb plate 24 and is immovably affixed to the hinge pin 30. The first hinge arm 40 is configured to maintain contact with the jamb plate 24 whether the hinge plate 20 is in the open position or the closed position. In exemplary embodiments, the first hinge arm 40 has a first hinge arm length 42 ranging between ½ inch and 1 inch and a first hinge arm width 44 ranging between ⅛ inch and ½ inch. In the embodiments depicted by FIGS. 3, 6, and 7, the first hinge arm 40 has a cylindrical shape, in which case the first hinge arm width 44 may be alternatively described as a first hinge arm diameter. However, the first hinge arm 40 does not need to be cylindrical.

A second hinge arm 50 is rotatably attached to the hinge pin 30 above the first hinge arm 40. The second hinge arm 50 contacts the door plate 22 and is configured to rotate around the hinge pin 30 to exert a pushing force on the door plate 22 which causes the door plate 22 to transition between the open position and the closed position. The second hinge arm 50 has a second hinge arm length 52 ranging between ½ inch and 1 inch and a second hinge arm width 54 ranging between ⅛ inch and ½ inch. In the embodiments depicted by FIGS. 3, 6, and 7, the second hinge arm 50 has a cylindrical shape, in which case the second hinge arm width 54 may be alternatively described as a second hinge arm diameter. However, the second hinge arm 50 does not need to be cylindrical, as long as the second hinge arm 50 is capable of rotating around the hinge pin 30.

A spring 60 with a distal end 62 opposite a proximal end 64 is wrapped around the hinge pin 30 above the second hinge arm 50. The distal end 62 of the spring 60 extends downward toward the first hinge arm 40 and the second hinge arm 50.

A first gear 70 is connected to the proximal end 64 of the spring 60. A second gear 80 is stacked on the first gear 70. The second gear 80 is opposite the first gear 70 from the spring 60. In other words, the first gear 70 is situated between the proximal end 64 of the spring 60 and the second gear 80. The first gear 70 and the second gear 80 are configured to rotate the proximal end 64, thereby twisting the spring 60 to a preloaded position. While in the preloaded position, the spring 60 is preloaded with a torsion sufficient to close the door. In embodiments, the torsion may have a range between 10 pounds and 15 pounds. For example, the spring 60 may be preloaded with 12 pounds of torsion, but alternative embodiments may include different torsion levels. The torsion should transfer sufficient mechanical energy from the spring 60 to the second hinge arm 50 to push the hinge plate 20 into the closed position, completely closing the door.

The first gear 70 and the second gear 80 include a plurality of pin slots 72 therein extending through the first gear 70 and the second gear 80. A gear pin 74 is removably inserted into the plurality of pin slots 72. The gear pin 74 is configured to retain the torsion.

A bismuth coating 90 encases the spring 60. While the bismuth coating 90 is in a solid phase, the bismuth coating 90 is configured to retain the spring 60 in the preloaded position. When the bismuth coating 90 is exposed to surrounding environmental temperatures meeting or exceeding approximately 520° F., the bismuth coating 90 melts, transitioning into a liquid phase. Once in the liquid phase, the bismuth coating 90 no longer holds the spring 60 in the preloaded position and the spring 60 is free to rotate, releasing the torsion. When the spring 60 rotates, the distal end 62 pushes the second hinge arm 50 around the hinge pin 30, thereby transferring the mechanical energy which was stored by the spring 60 into the second hinge arm 50 to the door plate 22 and pushing the hinge plate 20 into the closed position.

A spring assembly cap 100 with a generally cylindrical shape is formed by a wall 102 and a top surface 104. The spring assembly cap 100 covers the gear pin 74, the first gear 70, the second gear 80, and the spring 60. However, the distal end 62 of the spring 60 extends downward past the wall 102 opposite the top surface 104 to contact the second hinge arm 50. In some embodiments, the spring assembly cap 100 is formed of copper, which can efficiently transfer ambient heat to the bismuth coating 90, making the self-closing fire hinge 10 itself even more efficient.

In exemplary embodiments, the spring assembly cap 100 has a cap length 106 ranging between 1½ inch and 2 inches and a cap diameter 108 ranging between ½ inch and 1 inch.

For example, the cap length 106 may be 1⅞ inch and the cap diameter may be ¾ inch. The dimensions of the spring assembly cap 100 should be determined by the combined, assembled dimensions of the gear pin 74, the first gear 70, the second gear 80, and the spring 60. The spring assembly cap 100 should fit snugly over those elements and can thereby improve the aesthetics of the self-closing residential fire hinge apparatus 10.

The self-closing residential fire hinge apparatus 10 and its elements may be designed to fit within any existing residential or commercial door hinge. Thus, the dimensions provided in this disclosure are merely intended for illustrative purposes and should not be construed to narrowly confine the disclosure to the dimensions or measurements provided. The self-closing residential fire hinge apparatus 10 may be manufactured in a wide range of sizes to accommodate a wide range of hinges and doors. In some embodiments, the self-closing residential fire hinge apparatus 10 may have a total length 12 ranging between 5 inches and 6 inches and a total weight (not shown) ranging between ⅛ pound and 1 pound.

In use, the self-closing residential fire hinge apparatus 10 may be installed in any door hinge by simply removing the previously installed hinge pin from the hinge plate 20 and inserting the hinge pin 30 of the self-closing residential fire hinge apparatus 10. In preferred embodiments, the hinge pin 30 will be placed within the top-most hinge plate 20 that is closest to the ceiling because heat travels upward and that position will optimize efficiency. For example, the top-most hinge plate 20 is likely to be surrounded by temperatures at or above 520° F. before the lower hinge plates 20. Once the bismuth coating 90 melts from around the spring 60, the energy stored in the spring 60 is released. The first hinge arm 40 and the second hinge arm 50 contact the jamb plate 24 and the door plate 22 respectively, resulting in closure of an unimpeded residential door. With no fire or extreme heat in the environment, the self-closing residential fire hinge apparatus 10 works just like a standard hinge pin, allowing for normal, unimpeded movement of the door.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fire-actuated release mechanism for a door, the fire-actuated release mechanism comprising:
- a self-closing door hinge having a spring-actuated closure mechanism, the spring-actuated closure mechanism including:
  - a spring being pre-tensioned in an open position; and
  - a coating covering the spring, the covering being a solid material whereby the coating retains the spring in the open position, the coating having a melting point less than a melting point of the spring whereby the spring is released to a closed position when the coating is heated until the coating becomes malleable allowing the release of the spring into the closed position.

2. The fire-actuated release mechanism of claim 1, wherein the coating comprises bismuth.

3. The fire-actuated release mechanism of claim 1, further comprising:
- a spring assembly cap being configured to cover the spring-actuated closure mechanism, the spring assembly cap being formed of copper.

4. The fire-actuated release mechanism of claim 1, the self-closing door hinge further comprising:
- a hinge plate having a door plate, a jamb plate, and a central cylinder rotatably coupling the door plate with the jamb plate, the door plate being configured to couple to the door, the jamb plate being configured to couple to a door jamb, the central cylinder having a cylindrical channel therein extending throughout a length of the central cylinder, the hinge plate having an open position and a closed position, the jamb plate being separated from the door plate when the hinge plate is in the open position, the jamb plate directly contacting the door plate when the hinge plate is in the closed position;
- a hinge pin being inserted into the cylindrical channel;
- a first hinge arm affixed to the hinge pin above the hinge plate, the first hinge arm contacting the jamb plate and being immovably affixed to the hinge pin, the first hinge arm being configured to maintain contact with the jamb plate whether the hinge plate is in the open position or the closed position;
- a second hinge arm rotatably attached to the hinge pin above the first hinge arm, the second hinge arm contacting the door plate and being configured to rotate around the hinge pin to exert a pushing force on the door plate which causes the door plate to transition between the open position and the closed position;
- the spring having a distal end opposite a proximal end, the spring being wrapped around the hinge pin above the second hinge arm, the distal end of the spring extending toward the first hinge arm and the second hinge arm;
- a first gear connected to the proximal end of the spring;
- a second gear stacked on the first gear, the second gear being opposite the first gear from the spring;
  - the first gear and the second gear being configured to rotate the proximal end, thereby pre-tensioning the spring to the open position, the spring being pre-tensioned with a torsion sufficient to close the door when the coating is malleable;
  - the first gear and the second gear having a plurality of pin slots therein extending through the first gear and the second gear; and
- a gear pin being removably inserted into the plurality of pin slots, the gear pin being configured to retain the torsion.

5. The fire-actuated release mechanism of claim 4, wherein the torsion has a torsion range between 10 pounds and 15 pounds.

6. A door hinge with a fire-actuated release mechanism for a door, comprising:

a hinge plate having a door plate, a jamb plate, and a central cylinder rotatably coupling the door plate with the jamb plate, the door plate being configured to couple to the door, the jamb plate being configured to couple to a door jamb, the central cylinder having a cylindrical channel therein extending throughout a length of the central cylinder, the hinge plate having an open position and a closed position, the jamb plate being separated from the door plate when the hinge plate is in the open position, the jamb plate directly contacting the door plate when the hinge plate is in the closed position;

a hinge pin being inserted into the cylindrical channel, the hinge pin having a hinge pin length ranging between 3 inches and 4 inches and a hinge pin diameter ranging between ⅛ inch and ½ inch;

a first hinge arm affixed to the hinge pin above the hinge plate, the first hinge arm contacting the jamb plate and being immovably affixed to the hinge pin and configured to maintain contact with the jamb plate whether the hinge plate is in the open position or the closed position, the first hinge arm having a first hinge arm length ranging between ½ inch and 1 inch and a first hinge arm width ranging between ⅛ inch and ½ inch;

a second hinge arm rotatably attached to the hinge pin above the first hinge arm, the second hinge arm contacting the door plate and being configured to rotate around the hinge pin to exert a pushing force on the door plate which causes the door plate to transition between the open position and the closed position, the second hinge arm having a second hinge arm length ranging between ½ inch and 1 inch and a second hinge arm width ranging between ⅛ inch and ½ inch;

a spring having a distal end opposite a proximal end, the spring being wrapped around the hinge pin above the second hinge arm, the distal end of the spring extending toward the first hinge arm and the second hinge arm;

a first gear connected to the proximal end of the spring;

a second gear stacked on the first gear, the second gear being opposite the first gear from the spring;

the first gear and the second gear being configured to rotate the proximal end, thereby twisting the spring to a preloaded position, the spring being preloaded with a torsion sufficient to close the door when the spring is in the preloaded position, the torsion having a torsion range between 10 pounds and 15 pounds;

the first gear and the second gear having a plurality of pin slots therein extending through the first gear and the second gear;

a gear pin removably inserted into the plurality of pin slots, the gear pin being configured to retain the torsion;

a bismuth coating encasing the spring, the bismuth coating being configured to retain the spring in the preloaded position while the bismuth coating is in a solid phase, the bismuth coating melting and transitioning into a liquid phase when the bismuth coating is exposed to surrounding environmental temperatures exceeding 520° F., a copper spring assembly cap having a generally cylindrical shape formed by a wall and a top surface, the spring assembly cap covering the gear pin, the first gear, the second gear, and the spring, the distal end of the spring extending downward past the wall opposite the top surface to contact the second binge arm, the spring assembly cap having a cap length ranging between 1½ inch and 2 inches and a cap diameter ranging between ½ inch and 1 inch; and the door hinge having a total length ranging between 5 inches and 6 inches and a total weight ranging between ⅛ pound and 1 pound.

* * * * *